(12) United States Patent
König et al.

(10) Patent No.: US 8,042,677 B2
(45) Date of Patent: Oct. 25, 2011

(54) METHOD AND APPARATUS FOR DYNAMIC GAP OPTIMIZATION

(75) Inventors: Frank König, Essen (DE); Martin Wentzel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 490 days.

(21) Appl. No.: 11/658,289

(22) PCT Filed: Jun. 21, 2005

(86) PCT No.: PCT/EP2005/052860
§ 371 (c)(1),
(2), (4) Date: Oct. 15, 2008

(87) PCT Pub. No.: WO2006/010677
PCT Pub. Date: Feb. 2, 2006

(65) Prior Publication Data
US 2009/0032370 A1 Feb. 5, 2009

(30) Foreign Application Priority Data
Jul. 23, 2004 (DE) .................. 10 2004 035 821

(51) Int. Cl.
*B65G 47/31* (2006.01)
(52) U.S. Cl. .............. 198/460.1; 198/461.1; 198/575; 198/577; 198/579; 198/572

(58) Field of Classification Search .............. None
See application file for complete search history.

(56) References Cited

U.S. PATENT DOCUMENTS

| | | | | | |
|---|---|---|---|---|---|
| 3,485,339 | A | * | 12/1969 | Miller et al. | 198/460.1 |
| 4,360,098 | A | * | 11/1982 | Nordstrom | 198/418.1 |
| 4,934,510 | A | | 6/1990 | Lutgendorf | |
| 5,070,995 | A | * | 12/1991 | Schaffer et al. | 198/460.1 |
| 5,341,915 | A | * | 8/1994 | Cordia et al. | 198/460.1 |
| 5,634,551 | A | | 6/1997 | Francioni et al. | |
| 6,629,593 | B2 | * | 10/2003 | Zeitler | 198/460.1 |
| 2001/0035322 | A1 | | 11/2001 | Reinhart et al. | |
| 2002/0000361 | A1 | | 1/2002 | Reilly | |

FOREIGN PATENT DOCUMENTS

| | | |
|---|---|---|
| DE | 33 19 247 A1 | 11/1984 |
| DE | 195 24 805 A1 | 1/1996 |
| WO | WO 01/85582 A1 | 11/2001 |

* cited by examiner

*Primary Examiner* — Kavel Singh

(57) ABSTRACT

The invention relates to a method and a device for dynamic optimization of the gaps between objects transported serially on a conveyor, in particular the transport of pieces of luggage in luggage transport systems in airports. According to the invention, in order to achieve an optimal usage of the transport system, the separation between two adjacent objects for transporting is recorded by sensor and provided to an analytical unit as measured values for determination of a correction value for temporary alteration of the speed of a transporter supporting only one object, arranged between two adjacent transporters.

16 Claims, 1 Drawing Sheet

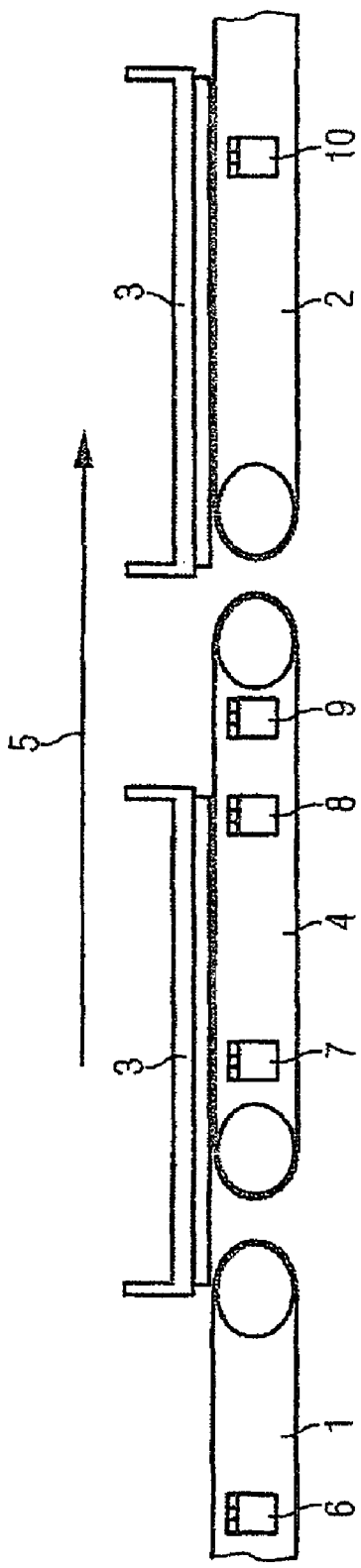
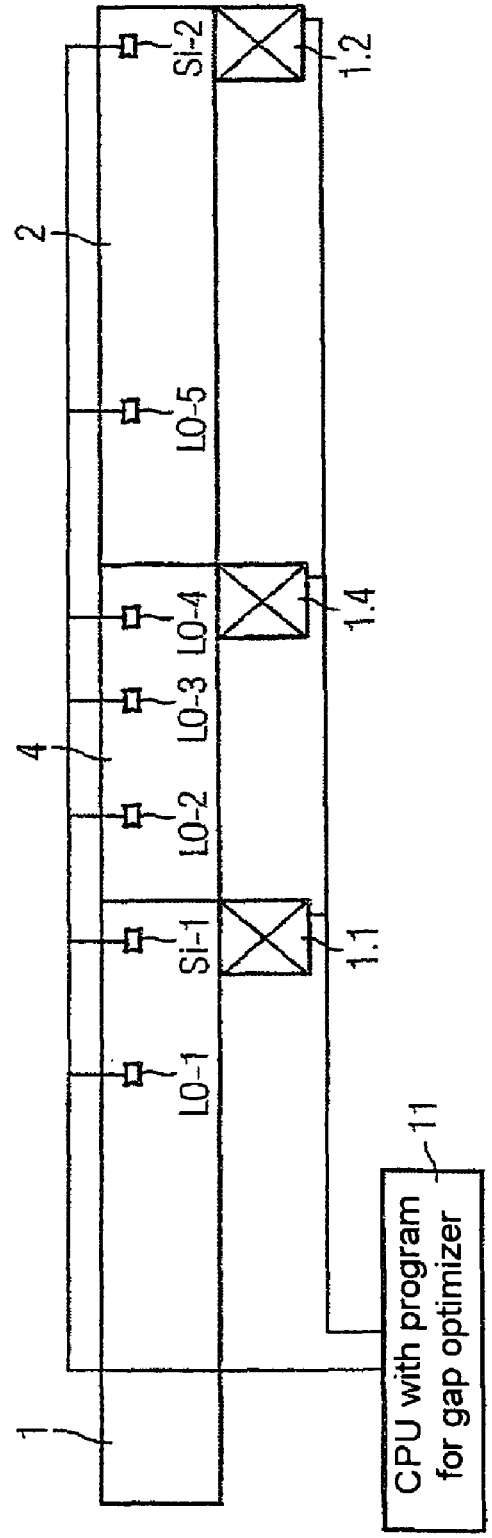

METHOD AND APPARATUS FOR DYNAMIC GAP OPTIMIZATION

CROSS REFERENCE TO RELATED APPLICATIONS

This application is the US National Stage of International Application No. PCT/EP2005/052860, filed Jun. 21, 2005 and claims the benefit thereof. The International Application claims the benefits of German application No. 10 2004 035 821.4 filed Jul. 23, 2004, both of the applications are incorporated by reference herein in their entirety.

FIELD OF INVENTION

The invention relates to a method and an apparatus for dynamic optimization of the gaps between objects which are being transported successively on a conveyor, in particular of containers for transportation of items of baggage in baggage conveyor installations at airports.

BACKGROUND OF THE INVENTION

In piece goods conveyor technology, the conveyed item can by conveyed in two different ways. It can either be transported directly on a conveyor, in general a belt system, or it is placed on a carrier, for example in a standard container in a container system, which is then transported on a conveyor.

Depending on the application and the nature of the conveyed item, one type of conveyance or the other may have advantages. The present invention is normally used in container systems, but can also be used with belt systems, taking account of specific requirements for the conveyed item.

One typical example of container systems is baggage conveyor installations at airports, where the baggage is loaded in a standard container, whose size is able to accommodate any baggage forms in question which can normally be checked in at the counter and are not regarded as outsized items. The permissible size is defined by the airport and thus governs the design of the baggage conveyor system.

The conveyor system itself comprises a complex structure of conveyor lines which have to transport the baggage to the various destinations in the system. For the economy of installations such as these, it is necessary for the conveyors used to be used as optimally as possible. This means that the number of containers to be transported must be designed to achieve as high a utilization level as possible for the conveyors. However, the system design means that a minimum separation must be provided between two containers, resulting from the mechanical design, and that this cannot be varied. One important factor for this minimum separation, for example, is the change in the separation between containers when they move round curves.

If a conveyor line is to be used optimally, then it is essential for the distance between two containers to correspond to the required minimum separation, or to be only insignificantly greater. This is particularly important in the case of so-called dynamic stores, which comprise a closed circle of conveyors which is continuously in motion, allowing containers to be fed in and fed out in any desired sequence via inputs and outputs. Each container can be fed out of a store such as this with a maximum delay which corresponds to the time which the container requires to complete one revolution in the store.

However, the feeding-in process is dependent on there being a gap between two containers in the conveyor flow in the store, which is sufficiently large in order to feed the new container in while maintaining the required minimum separations. If, as is normal in container systems, the containers are fed in chaotically, that is to say as soon as a suitable gap is available, then the separation between the containers is not maintained during the feeding in process, provided only that it is larger than the minimum length of the container. As the filling level rises, this results in a non-uniform distribution of the containers and thus in wasted storage space which results when there is a large difference between the minimum gap for feeding in (container length+2× minimum separation+safety margin) and the minimum separation between two containers. The conveyor is not use optimally. If the separations between the containers which lie between these values were to be redistributed, then this would result in gaps which are large enough to feed in additional containers.

SUMMARY OF INVENTION

The object of the present invention is to provide a method and an apparatus for reducing and for unifying the separations between the objects being transported successively on a conveyor, such as the containers in a container system, in particular a baggage conveyor installation at airports, which allows optimum utilization of the conveyor system to be achieved.

In order to achieve the object, a method is proposed in which the distance between adjacent objects to be conveyed is detected by sensors and is supplied as a measured value to an evaluation unit for determination of a correction value, from which, if required, a signal is formed in order to temporarily vary the speed of a conveyor which holds only one object and is arranged between two adjacent conveyors.

According to the invention, a plurality of sensors measure the distances between two objects. As soon as this distance is less than the minimum separation which would be required to feed in additional objects then the gap between the objects is reduced to the minimum separation. This reduces the free space which can no longer be occupied by objects in the conveying system, while, at the same time, the compression of the storage capacity at a different point in the system can create free space for further objects to be fed in.

According to another feature of the invention, the method is simplified in that the distance detected by sensors between two objects to be conveyed is mapped by the evaluation unit onto correction steps, each of which has a specific associated correction value. The distances between the objects moving past are thus subdivided into different categories, for example into those which necessitate a correction of different severity and others in which no corrections are required.

Thus, according to the invention, when the minimum separation between the adjacent objects already exists and has been measured, the correction value is 0, that is to say there is no need for any correction when the objects are already optimally close to one another.

According to the invention, this also applies when the measured distance between the adjacent objects is equal to or greater than the length of an object plus the minimum separation, and the correction value is also 0 in this case, because an additional object can be fed in without any problems.

If the determined correction value is greater than 0, that is to say the distance between two successive objects should be reduced, one particular feature of the invention provides that the object which is in general being transported via the transporting conveyor is speeded up in order to move it closer to the object being transported in front of it.

The method according to the invention is preferably used autonomously for normal process control, particularly in the field of baggage conveyance at airports, in order to increase the correction precision.

One apparatus which can be used to carry out the method according to the invention is characterized by a conveyor whose speed can be varied briefly and which is arranged between an input conveyor and an output conveyor, and which can be slowed down or accelerated as a function of the distance, detected by sensors, between two adjacent objects relative to the input conveyor and output conveyor. The conveyor is thus set to a speed which is higher or lower than the input and output conveyors. The objects which can be accelerated or decelerated in this way then move closer to the preceding object or to the next object, to be precise as a result of the slip that is produced by the speed difference. This minimizes the gaps on the conveyors and increases the installation utilization level.

A measurement apparatus according to the invention for detection of the distance between two adjacent objects preferably comprises a plurality of sensors, which are arranged at defined intervals in the conveyor, and activated by the objects passing through and, when two successive objects pass through, define correction steps as a function of their separations, in which the magnitude of the speed change of the variable-speed conveyor can be influenced.

According to the invention, the apparatus contains an evaluation unit for determination of the distances between the adjacent objects from the signals which are produced by the sensors, and for definition of a correction step whose signal can be used to control the drive for the conveyor. Depending on the determined correction step, the conveyor is accelerated to a greater or lesser extent, so that the respectively desired lag before the next object and the catching-up movement towards the preceding object can be controlled sufficiently accurately.

One important factor in this case, according to another feature of the invention, is that the variable-speed conveyor is designed to accommodate only one of the objects to be transported, in order to ensure individual correction.

According to the invention, the conveyor is provided with a surface which allows high friction with the object, and in that the surface of the subsequent output conveyor has less friction than this. The high friction allows spontaneous and rapid acceleration. In contrast, the subsequent conveyor has to operate with lesser friction, in order to allow sensible correction. The slip which the object receives as a result of the speed difference between the conveyor and the next conveyor changes the distance from the preceding object, and in the ideal case reduces it to the minimum separation.

When the invention is used in the baggage conveyor system at an airport, the conveyors in the conveyor system according to the invention are preferably in the form of belt conveyors with two conveyor belts which are separated from one another and on which the objects lie.

The invention provides a method and an apparatus for dynamic gap optimization, by means of which the gaps as described initially in a conveyor system of this generic type can be minimized in a simple manner, thus making it possible to increase the utilization level of the installation.

BRIEF DESCRIPTION OF THE DRAWINGS

The method of operation of the invention will be described in the following text with reference to its use in the baggage conveyor installation at an airport. In the figures:

FIG. 1 shows a schematic illustration of a detail of the container conveyor system according to the invention, and FIG. 2 shows the control scheme for the apparatus according to the invention.

DETAILED DESCRIPTION OF INVENTION

FIG. 1 shows a detail of the baggage conveyor installation at an airport, in a roughly schematic form. This shows the end of the input conveyor, which is annotated 1, and the start of the output conveyor, which is annotated 2, for the baggage containers, which are annotated 3. A further short conveyor is provided between the input conveyor 1 and the output conveyor 2, whose speed can be regulated and which is annotated 4. The baggage containers 3 are placed on the respective upper ran of the conveyors 1, 2 and 4, which are in the form of belt conveyors. The transport direction of the conveyors 1, 2 and 4 is indicated by an arrow at 5. FIG. 1 also schematically shows the sensors 6 to 10, which are arranged within the input and output conveyors 1, 2 and the conveyor 4 whose speed can be regulated, and which are activated as the containers 3 pass by. The sensors 6 to 10 are arranged such that they detect the distances between the objects as they move past, in such a way that these objects can be subdivided into different categories, as explained with reference to the control scheme shown in FIG. 2.

FIG. 2 shows the control scheme for the apparatus according to the invention, with the input conveyor 1 and the output conveyor 2 as well as the conveyor 4 whose speed can be regulated and which is arranged in between them are illustrated in a simplified form by their drives 1.1, 1.4 and 1.2. Sensors 6 to 10 from FIG. 1 are annotated here L0-1 to L0-5 and correspondingly illustrated with their respective point of attachment.

As the containers 3 pass by in the direction of the arrow 5 (FIG. 1), the distance between the two adjacent containers 3 is detected by the respectively activated sensors L0-1 to L0-5. The distance between the sensors L0-1 and L0-5 corresponds to the required minimum gap. If the sensors L0-4 and L0-5 are covered by the objects 3, then it can be deduced that the objects 3 are already separated by the minimum distance, and thus there is no need to correct the separation. However, if the sensor L0-3 detects the object but the sensor L0-4 does not detect it, then the distance between the objects 3 is greater than the defined minimum separation. Based on knowledge of the distances between the sensors, the evaluation unit 11 uses the received signal to determine the correction step 1, which corresponds to a specific signal for acceleration of the conveyor 4. The container placed on the conveyor 4 is accelerated via the motor 1.4 in order to drive the conveyor in the direction of the arrow 5 (FIG. 1), and moves closer to the container 3 being transported in front of it, until the defined minimum separation is reached.

If it is found by the sensors L0-3 and L0-4 which are not covered that the distance between the containers 3 is greater, corresponding to the distances between the sensors, then the correction step 2 is determined, as a result of which the signal calculated in the evaluation unit 11 for acceleration of the conveyor 4 is correspondingly different, and the container 3 which has been placed on the conveyor 4 is transported with even greater acceleration and at a higher speed in the direction of the container 3 being transported in front of it, that is to say in the direction of the arrow 5. A plurality of correction steps can be controlled, corresponding to the number of sensors arranged there and the distances between them, with one specific signal for the drive motor 1.4 for a conveyor 4 being associated with each of them, and accelerating the conveyor 4. If the sensors determine that the distance between the objects 3 is greater than the length of the minimum separation for a container, then the speed of the conveyor 4 is not corrected because sufficient space is then available to feed in an additional container 3.

The invention claimed is:

1. A method for dynamic optimization of a gap between objects successively transported on a conveyor, comprising:
    detecting a distance between adjacent objects to be conveyed on the conveyor by sensors;
    providing the detected distance as a measured value to an evaluation unit;
    comparing the detected distance between adjacent objects with a minimum feed separation and with a defined minimum separation, the minimum feed separation being a distance between the adjacent objects required to feed in an additional object between the adjacent objects and the minimum separation being smaller than the minimum feed separation;
    determining a correction step as a function of the detected distance by the evaluation unit out of a plurality of defined correction steps; and according to the determined correction step:
        when the detected distance is less than the minimum feed separation and greater than the defined minimum separation forming a signal by the evaluation unit based on the correction value step to temporarily vary the speed of the conveyor relative to an input and an output conveyor,
        when the detected distance is greater than the minimum feed separation proceeding with the operation of the conveyor without varying the speed of the conveyor,
    wherein the conveyor is provided between the input conveyor and the output conveyor and is designed to accommodate only one of the objects to be transported.

2. The method as claimed in claim 1, wherein proceeding with the operation of the conveyor without varying the speed is performed when the detected distance corresponds to the defined minimum separation.

3. The method as claimed in claim 1, wherein the minimum feed separation is at least equal to the length of an additional object plus the defined minimum separation.

4. The method as claimed in claim 1, wherein the method is performed autonomously for normal process control.

5. The method as claimed in claim 1, wherein the objects are containers for transportation of baggage items in a baggage conveyer installation at an airport.

6. The method as claimed in claim 1, wherein a minimum separation between adjacent objects required to feed in an additional object between the adjacent objects is defined and said step of forming a signal by the evaluation unit based on the correction step to temporarily vary the speed of the conveyor is performed when the detected distance is less than the minimum separation.

7. The method as claimed in claim 1, wherein the correction steps are defined by the sensors.

8. The method as claimed in claim 7, wherein the correction steps are defined as a function of the distance between the sensors.

9. The method as claimed in claim 1, wherein before said step of forming a signal to temporarily vary the speed of the conveyor, the speed of the conveyor is greater than 0 ft/s.

10. The method as claimed in claim 1, wherein when feeding the additional object between the adjacent objects while the feed separation is less than the minimum feed separation the speed of the variable-speed conveyor is varied to increase the distance between the adjacent objects to allow the feed in of the additional object between the adjacent objects.

11. An apparatus for dynamic optimization of a gap between objects successively transported on a conveyor, comprising:
    a measurement apparatus that detects a distance between two adjacent objects;
    an evaluation unit which is provided with the detected distance and determines a correction step as a function of the corrected distance; and
    a variable-speed conveyor arranged between an input conveyor and an output conveyor whose speed is varied according to the correction step to temporarily vary said speed relative to the input and the output conveyors,
    wherein the speed of the variable-speed conveyor relative to the input conveyor and the output conveyor is temporarily varied when the detected distance is less than a minimum feed separation and greater than a defined minimum separation,
    wherein speed of the variable-speed conveyor is maintained when the detected distance is greater than the minimum feed separation, and
    wherein the minimum feed separation being a distance between the adjacent objects required to feed in an additional object between the adjacent objects and the minimum separation being smaller than the minimum feed separation.

12. The apparatus as claimed in claim 11, wherein the measurement apparatus comprises a plurality of sensors arranged at defined intervals in the variable speed conveyor and is activated by the objects passing, and when two successive containers pass, correction steps are determined as a function of a separation distance between the two objects, where a magnitude of the speed change of the variable-speed conveyor is influenced.

13. The apparatus as claimed in claim 12 further comprising an evaluation unit that:
    determines the distances between the adjacent objects based on a plurality of input signals from the measurement apparatus sensors, and
    defines a correction step that controls a drive of the conveyor.

14. The apparatus as claimed in claim 13, wherein the objects are containers for transportation of baggage items in a baggage conveyer installation at an airport.

15. The apparatus as claimed in claim 14, wherein the variable-speed conveyor has a surface that provides a high friction interface between the conveyor and the container, and the output conveyor has a surface that provides a relatively lower friction interface between the conveyor and the container than that of the conveyor.

16. The apparatus as claimed in claim 11, wherein the variable-speed conveyor, the input conveyor and the output conveyor are belt conveyors having two conveyor belts each, separated from one another that transport the objects.

* * * * *